Nov. 14, 1933.  A. W. DE VOUT ET AL  1,934,915
EGG BREAKER'S TABLE
Filed March 18, 1932   2 Sheets-Sheet 2
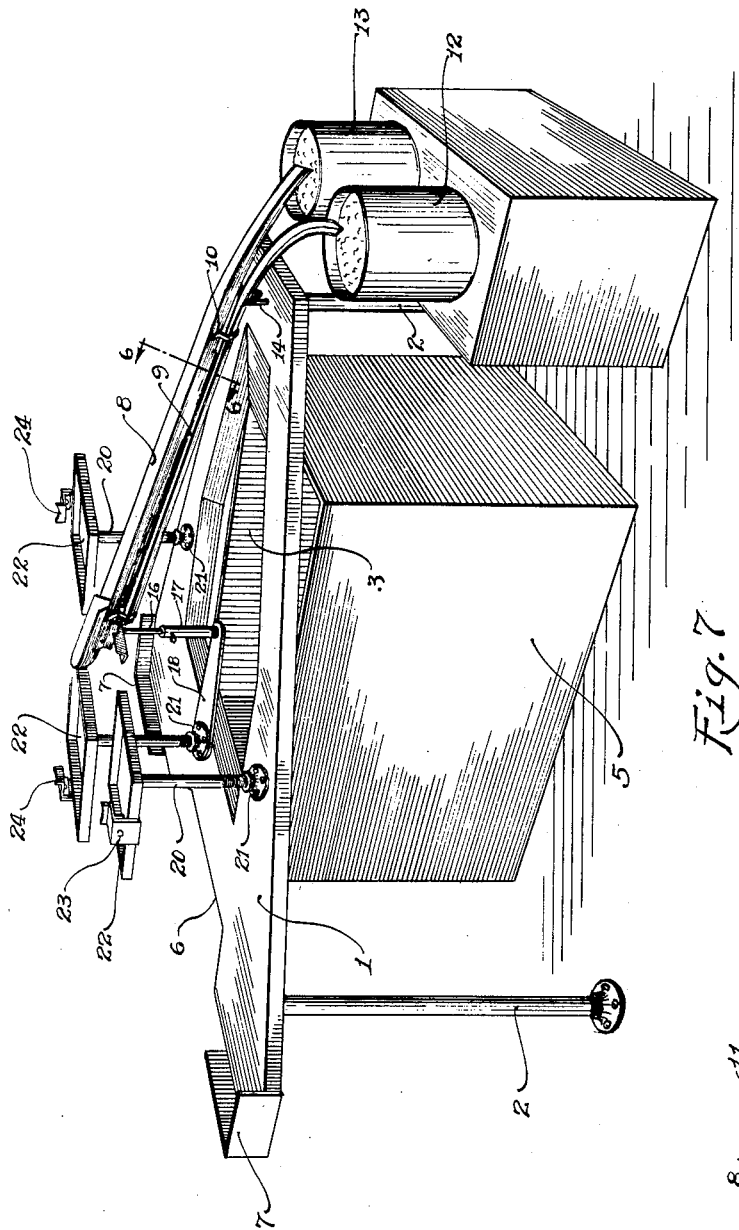
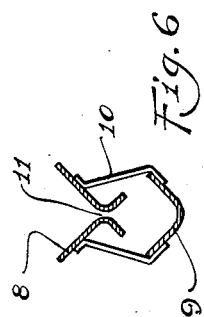
Anson W. DeVout
Richard W. Regensburger
INVENTORS
WITNESS
BY
ATTORNEY Patented Nov. 14, 1933

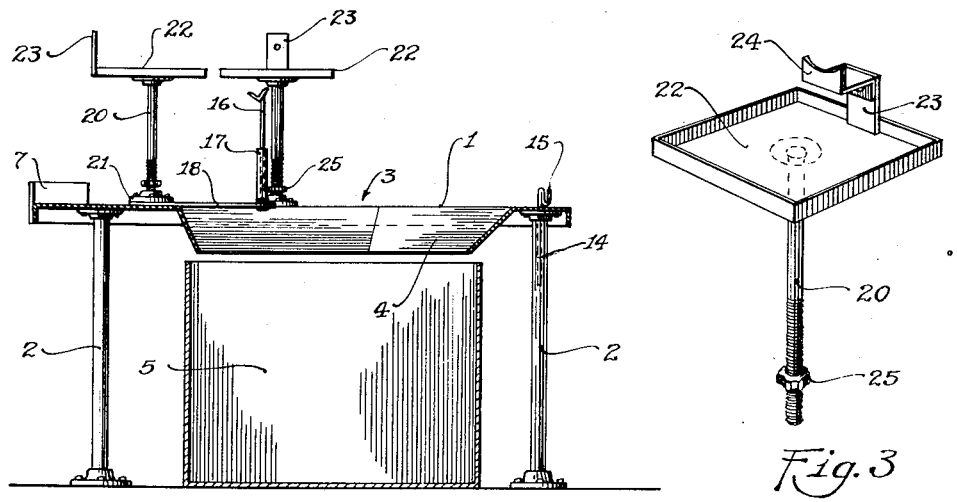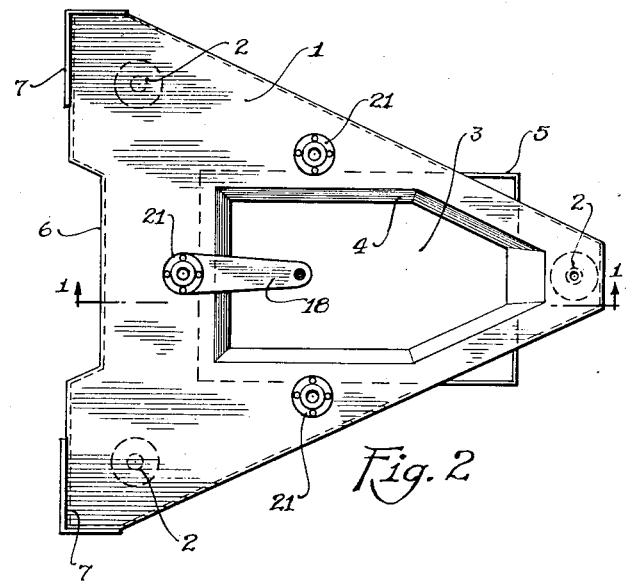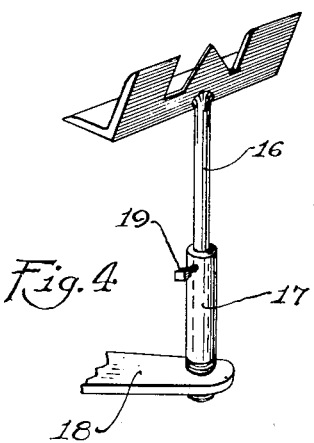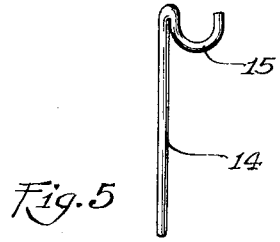

1,934,915

UNITED STATES PATENT OFFICE 1,934,915

EGG BREAKER'S TABLE

Anson W. De Vout and Richard W. Regensburger, Chicago, Ill., assignors to Swift and Company, Chicago, Ill., a corporation of Illinois Application March 18, 1932. Serial No. 599,722

2 Claims. (Cl. 146—2)

The invention provides a device to facilitate the separation of eggs and enables a number of individuals to gather about a table and perform work in an effective and rapid manner without interference, one with the other.

The invention contemplates a table, the top of the table having a centrally disposed opening therein through which the egg shells are discharged and received on the floor or in a receptacle placed below the opening, the top having a depending flange in line with and surrounding the opening therein to provide a guard for deflecting the egg shells into a receptacle. A plurality of stands are mounted upon the top of the table and are conveniently grouped about the opening therein. A separating means is mounted on the table and extends across the opening therein at an angle which is adjustable to regulate the movement of the contents of the eggs thereover.

The invention relates to the novel features and structural details hereinafter more fully described and specifically claimed.

Referring to the drawings,—

Figure 1 is a sectional view of an egg breaking table illustrative of embodiment of the invention.

Figure 2 is a top plan view of the table the separating chute and stands being removed.

Fig. 3 is a detail perspective view of one of the stands to be mounted upon the table.

Fig. 4 is a detail perspective view of the adjustable support for varying the inclination of the separating chute.

Fig. 5 is a detail view of the upper portion of the support for delivery end of the separating chute.

Fig. 6 is a detail cross section at 6—6 shown on Fig. 7.

Fig. 7 is a detail perspective view of the table.

Corresponding and like parts are referred to in the following description and designated in the several views of the drawings by like reference characters.

The table comprises a top 1 and legs 2. An opening 3 is formed centrally of the table top 1 and its forward portion tapers, as indicated most clearly in Fig. 2 of the drawings. A flange 4 depends from the table top 1 in line with the openings 3 and is inwardly deflected and constitutes a guard to direct the egg shells into a receptacle 5 arranged below the top 1 in position to receive the shells as they are discharged through the opening 3. The top of the table is of triangular outline and its rear side is indented, as indicated at 6, to provide clearance for a person occupying a position at the rear of the table. Upstanding flanges 7 are provided at the rear corners of the table.

Means for separating the whites from the yolks of eggs, in this instance, consists preferably of two chutes 8 and 9. Chute 8 suspended directly above chute 9 fastened to each other by means of brackets 10. These chutes are disposed above the table and extend across the opening 3 at an inclination regulable to provide for controlling the flow of egg contents thereover. The chute 8 has a longitudinal slot 11 in its bottom to permit the whites of the eggs to separate from the yolks, the whites passing from the chute 8 through the slot 11 into the lower chute 9, the latter not having a slot in its bottom so as to permit the separated whites of the eggs to flow downwardly in chute 9 to the receptacle 12 supported in any suitable manner desired with relation to the discharge end of the chute 9.

The lower end of the chute 8 is deflected laterally as shown to deposit the yolks of the eggs in a receptacle 13 arranged adjacent the aforesaid whites receiving receptacle 12.

The discharge ends of the chutes 8 and 9 are supported in any suitable manner, as by means of an upright 14 having a bracket 15 to receive the outer end of the chute 9. This upright 14 may be mounted on the top of the table in any suitable manner. The receiving or upper end of the chute 9 is supported in any suitable manner, as by means of a standard including telescoping members 16 and 17 mounted upon the forward end of an arm 18 which projects forwardly from the rear portion of the table top over the opening 3 in the table top, there being a binding screw 14 threaded into the telescoping member 17 for adjustment purposes so that by varying the height of the adjustable standard 16 the inclination of the chutes 8 and 9 may be changed to regulate the flow of the egg contents thereover.

A plurality of stands are mounted upon the top of the table and they are grouped about the sides of the opening 3. Each stand includes a post 20 having a threaded lower end adapted to have working fit in a threaded socket member 21. A plate or tray 22 of any suitable structure is mounted on the upper end of each post 20, and preferably in the form of a tray. Each of these stands includes also a bracket 23 to hold removable knife 24 on which the shells of the eggs may be cracked preliminary to discharging the contents upon the chute 8. These combined egg breaking elements and trays are each maintained in rigid position in the respective sockets 21 by means of a suitable nut 25.

As illustrated there is one of these stands on each side of the table top 1 flanking the egg separating means with another stand at one end of the table in close proximity to the inner end of the egg separating means. Such an arrangement admits of several individuals gathering around the table and performing efficient work without one interfering with another.

In the practical application of the invention the table is suitably positioned and the separating chute 8 is adjusted to regulate the flow of the contents of the eggs thereover. Each individual performs independently of the others, the eggs being cracked over the breaker 24 and the contents discharged upon the receiving end of the chute 8. The whites are separated from the yolks in the flow of the contents over the chute, the whites being received in one of the receptacles 12, and the yolks in the other receptacle 13.

What is claimed is:

1. In an egg breaker assemblage a horizontally extending flat table top of approximately triangular outline and having a centrally disposed opening, peripheral flange portions depending from along the marginal portion defining said central opening, a set of inclined egg separating chutes extending above the table top and adjustably supported by standards carried by the table top so that the high ends of the chutes are over the central portion of the wide rear end of the table top and so that the lower ends of the chutes extend beyond the narrow front end of the table top, a set of receiving trays at the rear wide end portion of the table top, each of which trays is carried on a vertically adjustable standard which is in turn carried on and supported by the table and each of which trays also has an associated cutter, of said trays there being one located behind but adjacent to the high receiving end of the uppermost separating chute and one located at each side of but adjacent to said high receiving end of said chute, each of the trays of the set being positioned with respect to said receiving end of said uppermost chute so that an operator adjacent to any one of the trays can readily remove an egg from the tray, can readily crack the shell of the egg by the employment of the cutter of the tray, can after the egg shell has thus been cut or cracked readily discharge the liquid content into the receiving portion of the uppermost chute and can readily deliver the emptied shell parts into and through the central discharge opening of the table top.

2. In an egg breaker assemblage a flat horizontally extending table top of approximately triangular outline and having a centrally disposed opening, a set of egg separating chutes comprising an upper inclined chute having a slotted portion and a lower inclined chute below the slotted portion of the upper chute for receiving the white of the egg as the whole yolks move along the upper chute, which set of chutes are supported by standards carried by the table top and are arranged so that the receiving end portion of the upper chute is located over the wide rear end portion of the table top and so that the lower ends of the chutes extend in diverging paths beyond the narrow front end portion of the table top, a set of receiving trays at the rear end portion of the table top, in which set some of the trays are located upon opposite sides of the receiving end portion of the upper chute, each of which trays is carried on a standard which is in turn carried on and supported by the table top, each of said trays also having an associated cutter and each tray being positioned adjacent to the receiving end portion of the upper chute whereby an operator adjacent the tray can readily remove an egg from the tray and can readily crack the shell of the egg on the cutter, whereby after the egg shell has been thus cut or cracked he can readily discharge the liquid content into the receiving portion of the upper chute, and whereby he can readily deliver the emptied egg shell parts into and through the central discharge opening.

ANSON W. DE VOUT.
RICHARD W. REGENSBURGER.